(12) United States Patent
Skirde

(10) Patent No.: US 10,524,026 B2
(45) Date of Patent: Dec. 31, 2019

(54) HYDROSTATIC SYSTEM

(71) Applicant: Danfoss Power Solutions GmbH & Co. OHG, Neumunster (DE)

(72) Inventor: Eckhard Skirde, Neumunster (DE)

(73) Assignee: Danfoss Power Solutions G.m.b.H. & Co. OHG, Neumünster (DE)

( * ) Notice: Subject to any disclaimer, the term of this patent is extended or adjusted under 35 U.S.C. 154(b) by 183 days.

(21) Appl. No.: 15/701,792

(22) Filed: Sep. 12, 2017

(65) Prior Publication Data

US 2018/0084315 A1 Mar. 22, 2018

Related U.S. Application Data

(60) Provisional application No. 62/395,400, filed on Sep. 16, 2016.

(51) Int. Cl.
| | |
|---|---|
| *H04Q 9/00* | (2006.01) |
| *F03C 1/00* | (2006.01) |
| *F04B 49/06* | (2006.01) |
| *F04B 51/00* | (2006.01) |
| *F04B 53/16* | (2006.01) |
| *F16H 61/42* | (2010.01) |
| *G08C 17/02* | (2006.01) |

(52) U.S. Cl.
CPC ............. *H04Q 9/00* (2013.01); *F03C 1/003* (2013.01); *F04B 49/06* (2013.01); *F04B 51/00* (2013.01); *F04B 53/16* (2013.01); *F16H 61/42* (2013.01); *G08C 17/02* (2013.01); *F04B 2203/1201* (2013.01); *F04B 2205/06* (2013.01); *H04Q 2209/40* (2013.01); *H04Q 2209/88* (2013.01)

(58) Field of Classification Search
CPC .......... F16H 61/42; F04B 53/16; F04B 49/06; F04B 51/00; G08C 17/02; F03C 1/003
See application file for complete search history.

(56) References Cited

U.S. PATENT DOCUMENTS

| | | | | |
|---|---|---|---|---|
| 5,141,402 | A * | 8/1992 | Bloomquist | B29C 45/82 417/217 |
| 6,933,638 | B2 * | 8/2005 | Hirth | H02K 5/225 310/62 |
| 7,729,860 | B2 | 6/2010 | Pabon et al. | |
| 9,206,667 | B2 * | 12/2015 | Khvoshchev | E21B 34/16 |

(Continued)

FOREIGN PATENT DOCUMENTS

| | | |
|---|---|---|
| CN | 2575078 Y | 9/2003 |
| CN | 103222199 A | 7/2013 |
| CN | 204992723 U | 1/2016 |

(Continued)

*Primary Examiner* — Abiy Teka
(74) *Attorney, Agent, or Firm* — McCormick, Paulding & Huber LLP

(57) ABSTRACT

A hydrostatic system includes a hydraulic system and at least one sensor configured to monitor a parameter of the hydraulic system, the at least one sensor including a wireless transmitter configured to generate wireless transmissions based on the parameter. The hydrostatic system further includes an electronic control box including a wireless receiver that is configured to receive the wireless transmissions generated by the at least one sensor. The electronic control box is configured to control the hydraulic system based at least in part on the received wireless transmissions.

17 Claims, 6 Drawing Sheets

(56) References Cited

U.S. PATENT DOCUMENTS

2016/0074262 A1 3/2016 Moses et al.

FOREIGN PATENT DOCUMENTS

| | | |
|---|---|---|
| CN | 105720638 A | 6/2016 |
| CN | 205370937 U | 7/2016 |
| CN | 106592676 A | 4/2017 |
| JP | H09156413 A | 6/1997 |
| JP | 2005204256 A | 7/2005 |
| JP | 2013221309 A | 10/2013 |
| JP | 2016071403 A | 5/2016 |

\* cited by examiner

HYDROSTATIC SYSTEM

CROSS-REFERENCE TO RELATED APPLICATIONS

This application claims priority to U.S. Provisional Patent Application No. 62/395,400 filed Sep. 16, 2016, which is hereby incorporated by reference herein in its entirety.

TECHNICAL FIELD

The present disclosure relates to hydrostatic systems including hydrostatic units such as pumps and motors.

BACKGROUND

Hydrostatic systems include hydrostatic units, such as pumps, motors, and the like, and are often used in mobile hydraulic equipment and vehicles.

Hydrostatic units often have a variety of sensors such as pressure sensors, speed sensors, angle sensors, temperature sensors and the like. These sensors are wired to an electronic control box that controls the unit, or several units forming a hydrostatic system. The electronic control box may be mounted directly to the hydrostatic unit, to one or more of the several units forming the hydrostatic system, or may be installed remotely at another location inside the vehicle system.

Referring to FIGS. 1A and 1B, an exemplary hydrostatic unit 10 is shown having two pressure sensors 12 and one speed sensor 14. The pressure sensors 12 and the speed sensor 14 are wired to an electronic control box 16 through cables or wiring harnesses 18 that have connectors 20 facilitating the connection the sensors 12.

These cables or wiring harnesses 18 are difficult to handle in production and maintenance due to space and wire routing constraints, particularly as the usage of sensors around, upon and within hydrostatic units increases. The harnesses 18 are often obstructing access to parts of the host compartment and/or are in the way of other components within the engine compartment, which may cause the harnesses 18 and/or connectors 20 to be ripped off of the sensor 12 by accident. For example, FIG. 2 shows a picture of a hydrostatic unit 10 installed in a vehicle with arrows pointing to two sensors 12 of the hydrostatic unit.

The connectors 20 of the wiring harnesses 18 are a common source of reliability issues with hydraulic systems because the connections between the connectors 20 and sensors 12 need to be waterproof even against direct water pressure from, for example, a high pressure washer, so that water-borne and solid contaminants that are common within the engine compartments of the vehicles, and equipment, in which the hydrostatic unit 10 is used, do not cause sensor failure. Dirt, moisture, extreme temperatures (−40° C. to +100° C.) and similar contaminants in engine compartments, where hydrostatic units 10 and systems are often housed and directly attached to an engine, are common to the environment. Thus, it is best if the connectors 20 remain as undisturbed as possible.

Additionally, an increasing number of sensors increases the number of wiring harnesses and connectors adding cost, in addition to the reliability issues.

SUMMARY

The present disclosure provides hydrostatic units that overcome the wiring harness and connector issues as discussed above.

According to the present disclosure, a hydrostatic system comprises a hydrostatic unit with a hydraulic system that is part and parcel of a hydraulic system. The hydrostatic system includes at least one sensor configured to monitor one or more parameters of the hydrostatic unit, the at least one sensor including a wireless transmitter configured to generate wireless transmissions based on the parameter. The hydrostatic system further comprises an electronic control box including a wireless receiver that is configured to receive the wireless transmissions generated by the at least one sensor. The electronic control box is configured to control the hydrostatic system based at least in part on the received wireless transmissions.

According to the present disclosure, the hydrostatic system may further comprise a housing in which at least part of the hydrostatic unit is disposed. The at least one sensor may be mounted to the housing. The electronic control box may also be mounted to the housing or may be detached from the housing.

According to the present disclosure, the at least one sensor may include a pressure sensor. The at least one sensor may also include a speed sensor. The hydrostatic system may also include a plurality of sensors that includes one or more pressure sensors and/or one or more speed sensors.

According to the present disclosure, the hydrostatic unit may include at least a pump and/or a motor, or several pumps and/or motors.

According to the present disclosure, the electronic control box may also comprise a wireless transmitter configured to generate reverse wireless transmission, and the at least one sensor may further comprise a wireless receiver configured to receive the reverse wireless transmissions generated by the electronic control box. The at least one sensor may also comprise a battery and the reverse wireless transmissions may include power to charge the battery.

These and other objects, features and advantages of the present disclosure will become apparent in light of the detailed description of embodiments thereof, as illustrated in the accompanying drawings.

DETAILED DESCRIPTION

Figure 1A:
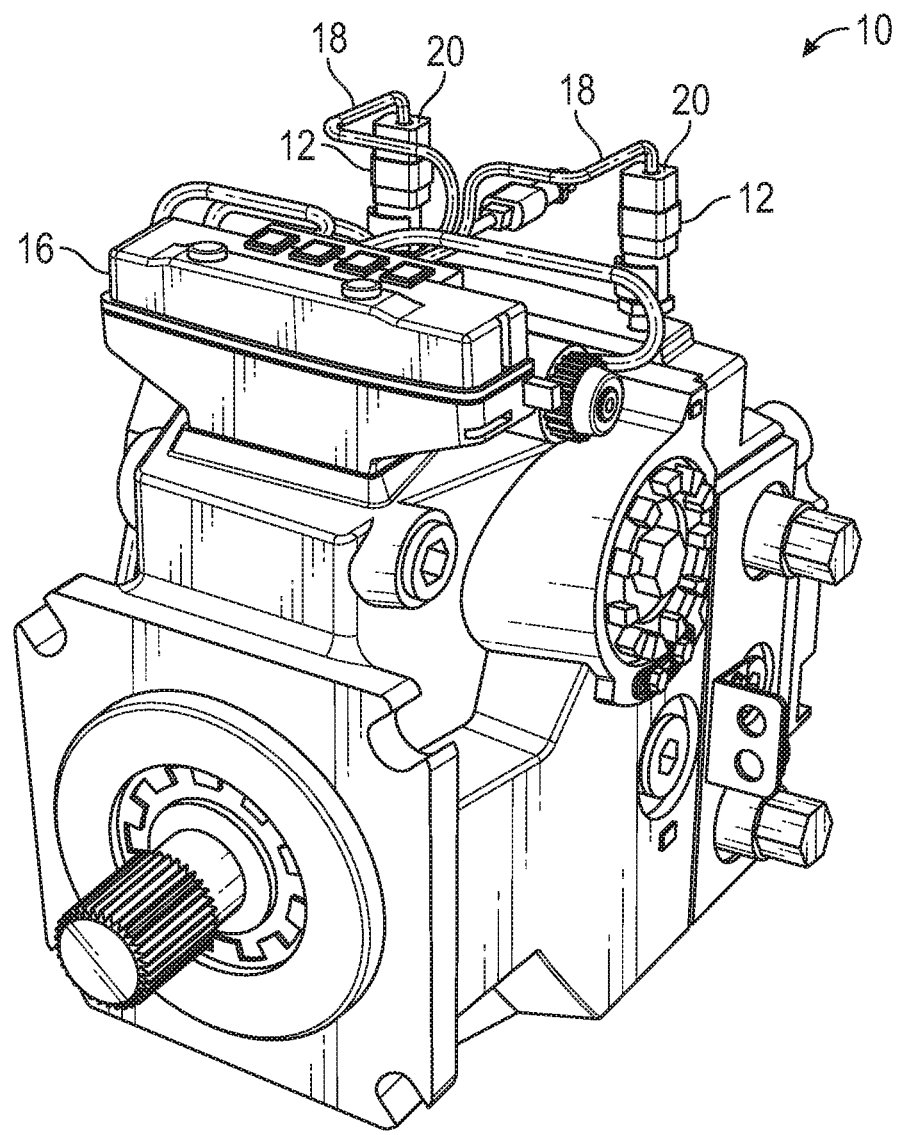
FIG. 1A is a front perspective view of a prior art hydrostatic unit.
Figure 1B:
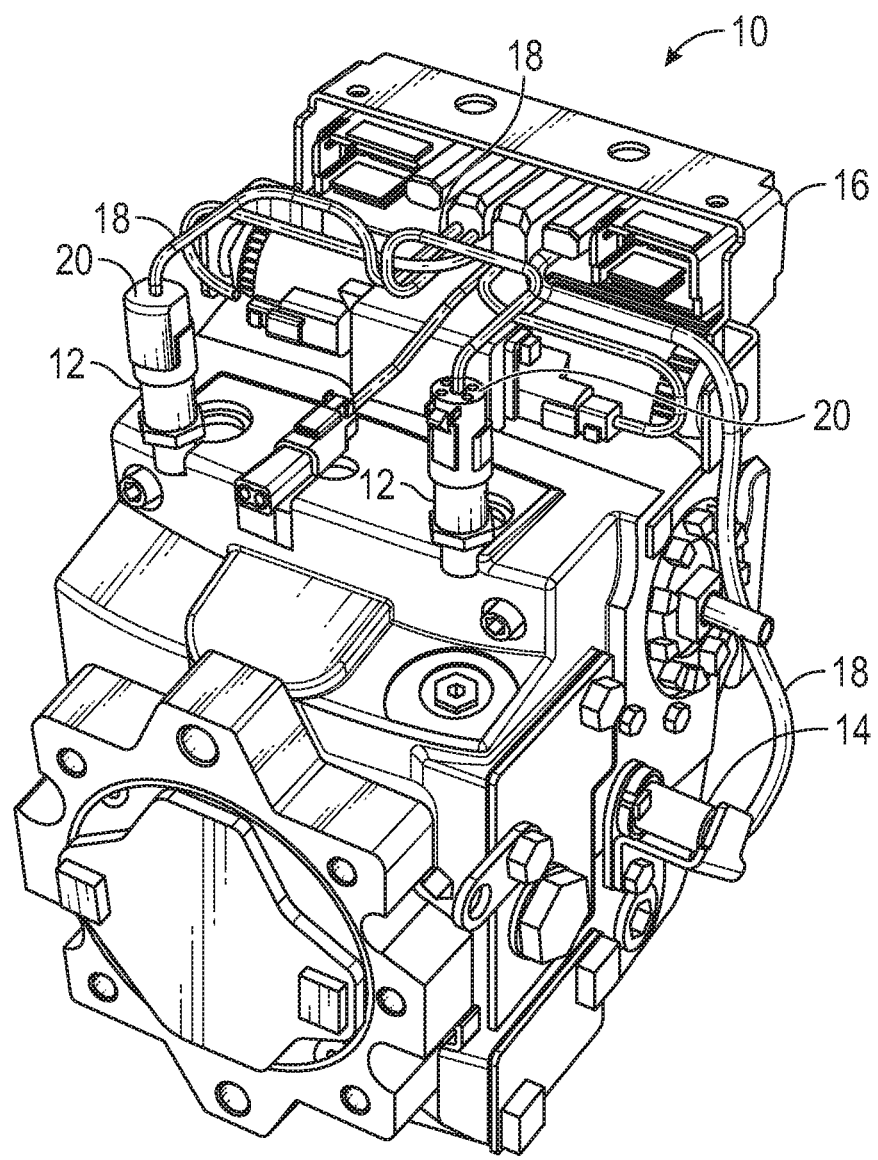
FIG. 1B is a rear perspective view of the prior art hydrostatic unit of FIG. 1.
Figure 2:
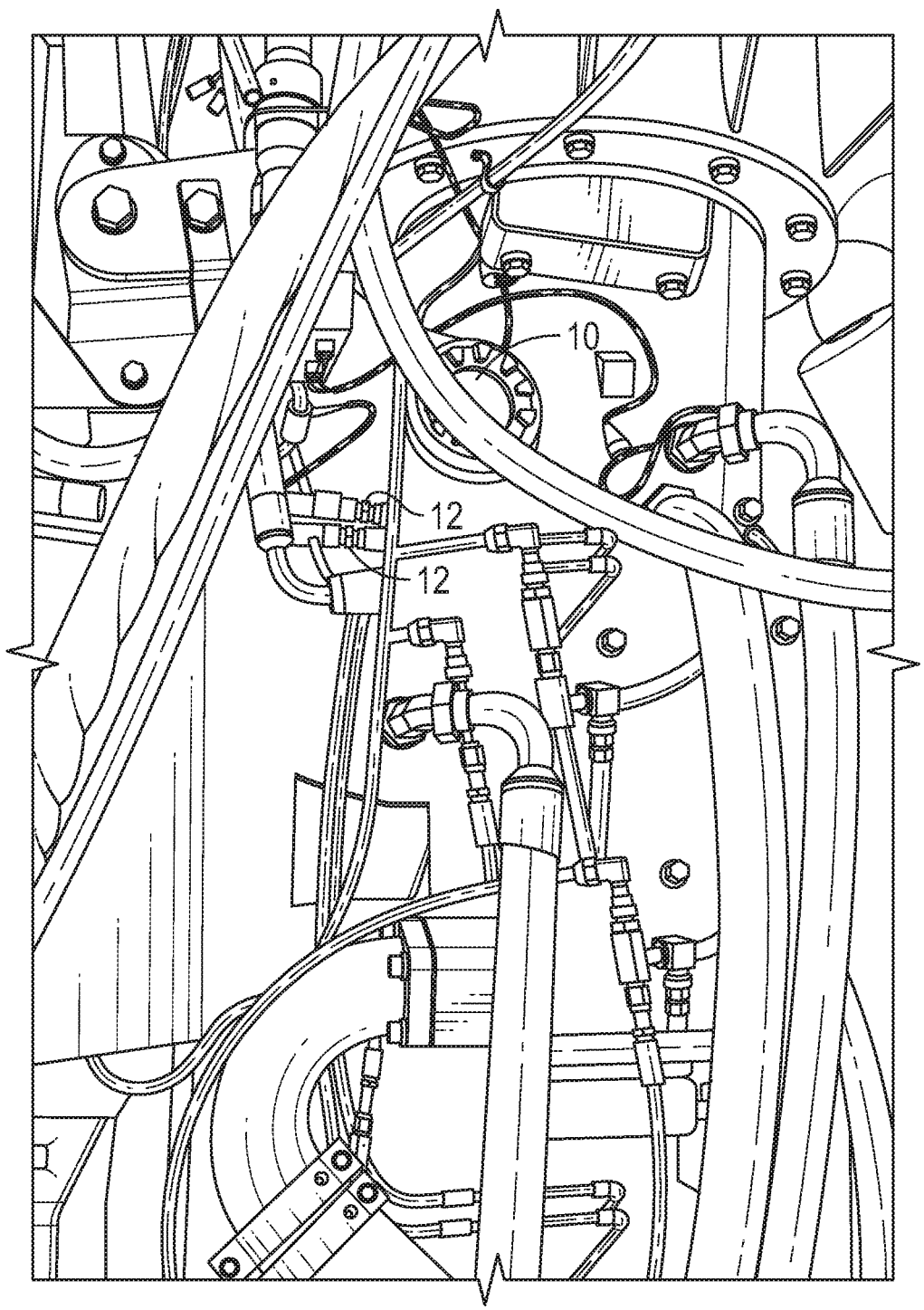
FIG. 2 is top view of a prior art hydrostatic unit installed in a vehicle.
Figure 3A:
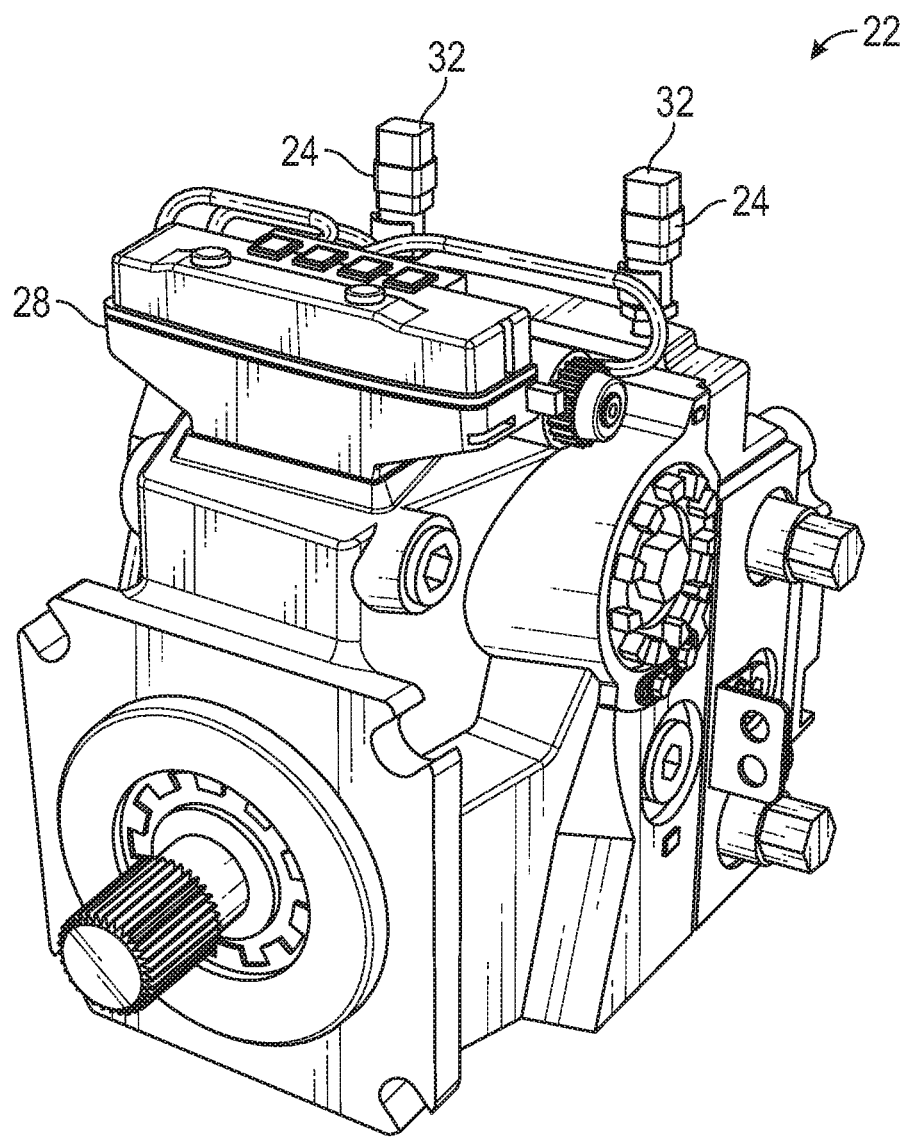
FIG. 3A is a rear perspective view of a hydrostatic unit according to the present disclosure.
Figure 3B:
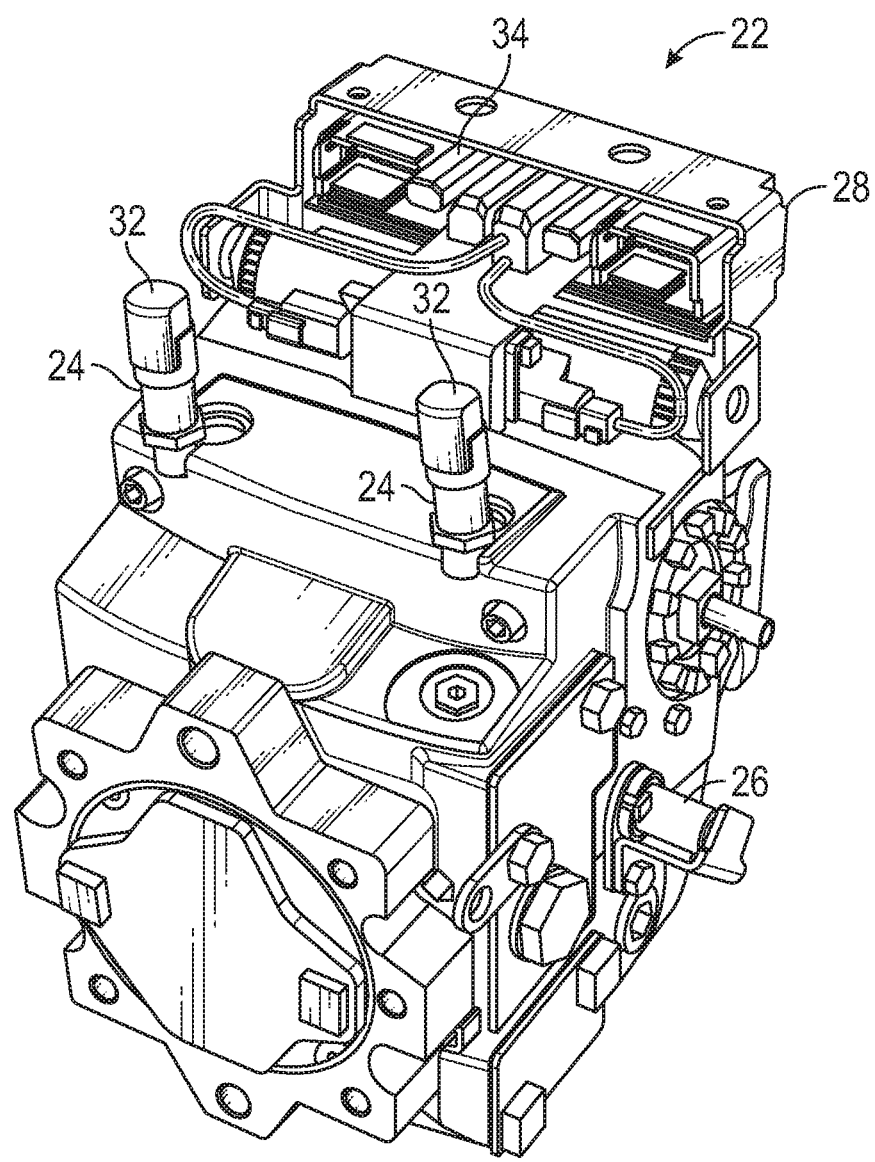
FIG. 3B is a front perspective view of the hydrostatic unit of FIG. 3A.

Referring to FIGS. 3A and 3B, a hydrostatic system 22 according to the present disclosure is shown. The hydrostatic system 22 comprises at least one hydrostatic unit 23 that may be a hydraulic system such as a pump, motor, or other similar hydraulic component, typically used in piece of mobile hydraulic equipment and/or a vehicle.

The hydrostatic system 22 has two pressure sensors 24 and one speed sensor 26 and an electronic control box 28 that controls the respective hydrostatic system 22. Although shown as being mounted directly to the housing of the hydrostatic unit 23, the electronic control box 28 may alternatively be installed remotely at another location inside the vehicle as discussed above. Additionally, although only pressure and speed sensors are shown for exemplary purposes, it should be readily understood that the hydrostatic system 22 may include a variety of sensors in addition to pressure and speed sensors, such as angle sensors to detect the displacement of the unit, temperature sensors and the like. These various sensors may provide pump and/or motor specific sensor data which may, in turn, be used to provide specific control functions for running the hydrostatic system 22, mobile hydraulic equipment and/or vehicles. These control functions are included within, or converted into, vehicle control systems that require sensed data from the sensors as part of their respective processes.

For example, pressure data streams are used to control pump charging pressure, and limit high pressure respectively. The control of high pressure can be a limitation of the maximum pressure wherein a closed circuit hydraulic system the variable displacement pump shall reduce its displacement to a specified and measured value in order to limit the energy dissipation across certain relief valves, and/or protect the system from pressure overshoots. In the case of variable displacement motors connected to variable displacement pumps pressure signals are utilized to control the output torque and/or optimize the efficiency of an exemplar hydrostatic transmission, in order to run within desired pressure ranges or along defined pressure profiles.

Notably missing from the hydrostatic system 22 are the cables or wiring harnesses and connectors connecting the sensors to the electronic control box.

Figure 4:
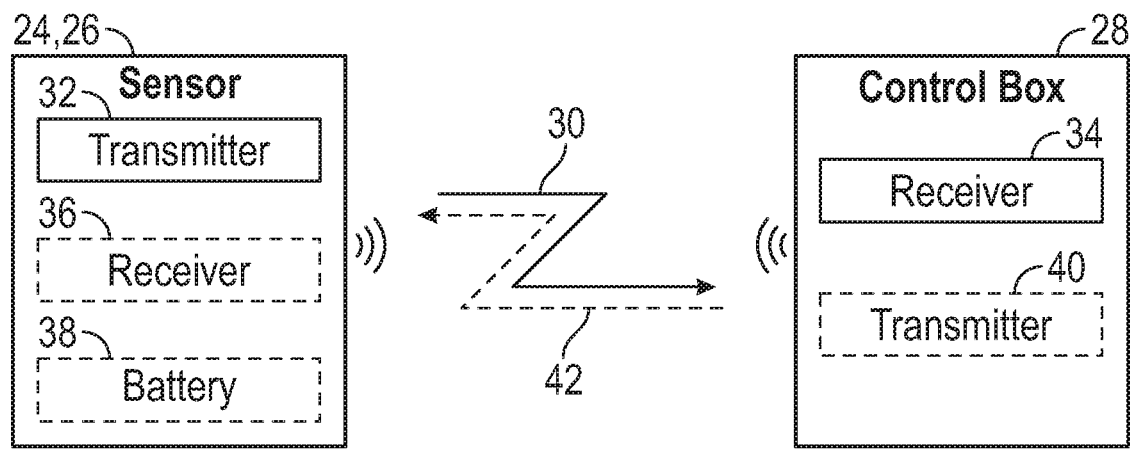
FIG. 4 is a schematic diagram showing a sensor and a control box of the hydrostatic unit if FIGS. 3A and 3B.

Referring to FIG. 4, each of the sensors 24, 26 is in wireless communication with the electronic control box 28. Specifically, each of the sensors 24, 26 includes a wireless transmitter 32 that transmits sensor signals as wireless transmissions 30 from the sensor 24, 26 to the electronic control box 28. The electronic control box 28 includes at least one receiver 34 for receiving the wireless transmissions 30 from the sensors 24, 26. The electronic control box 28 may include a single receiver 34 for all of the sensors 24, 26 or may include a plurality of receivers 34, with each receiver 34 of the plurality being associated with a different sensor 24, 26. The wireless transmitters 32 and at least one receiver 34, thus, provide one-way communication between the sensors 24, 26 and the electronic control box 28.

The electronic control box 28 also includes all of the necessary electronics, software, memory, storage, databases, firmware, logic/state machines, microprocessors, communication links, and any other input/output interfaces to control the hydrostatic unit 22 as necessary and/or desired for the vehicle. For example, the electronic control box 28 may include, or be in communication with, one or more processors and memory, which may include system memory, including random access memory (RAM) and read-only memory (ROM) that are configured to control the hydrostatic unit 23 and/or a hydraulic or hydrostatic system 22 and/or vehicle as desired.

As see in FIG. 4, the sensors 24, 26 and the electronic control box 28 may, instead, be in two-way communication. For example, each sensor 24, 26 may also include a receiver 36 and/or battery 38 and the electronic control box 28 may also include a transmitter 40 for facilitating reverse wireless transmissions 42 from the electronic control box 28 to the sensors 24, 26, in addition to the wireless transmissions 30 from the sensor 24, 26 to the electronic control box 28. Since the energy consumption of sensors 24, 26 for hydrostatic units 22 is typically very low, the energy necessary to power the sensors 24, 26 may be transmitted from the electronic control box 28 to the sensor 24, 26 through the transmitter 40 and receiver 36 and, thus, the battery 38 may be omitted.

The wireless transmissions 30 and/or the reverse wireless transmissions 42 between the sensors 24, 26 and the electronic control box 28 may be made using radio frequency identification (RFID) technology or the like. For example, RFID technology includes active, semi-passive and passive RFID tags that may store and broadcast data over varying distances. Since the distances between the sensors 24, 26 and the electronic control box 28 are typically relatively short in hydrostatic systems 22, regardless of whether the control box 28 is mounted to the hydrostatic unit 23 or remotely in the vehicle, RFID technology will advantageously not be affected by outside electronic noise.

Additionally, where interference is a concern, shielding may be used to protect the transmitting 'zone/nodal' area around the sensors 24, 26 so as to ensure that nothing interferes with the air between the sensors 24, 26 and the electronic control box 28. For example, the shielding may be used in a similar manner to how shielding is used to protect sensors and wiring harnesses around conventional hydrostatic units. The shielding may be, for example, plastic, metal, a composite material, or any other material that exhibits the required shielding properties.

The wireless transmissions 30 and/or the reverse wireless transmissions 42 between the sensors 24, 26 and the electronic control box 28 may also be used for various other purposes, such as, for example, providing a sensor health check function in order to verify the integrity of the sensors 24, 26, and/or to provide the ability for the control system to run calibration routines and set routines on the sensors 24, 26, on the sensor control system, and/or any other subsystem.

Sending the sensor signals from sensors 24, 26 wirelessly to the electronic control box 28 as wireless transmissions 30, whether the electronic control box 28 is mounted directly to the hydrostatic unit 23 or installed remotely from the hydrostatic unit 23 elsewhere inside the vehicle, advantageously improves reliability by eliminating the cables or wiring harnesses and connectors typically necessary to connect sensors to electronic control boxes for hydrostatic units, thereby eliminating the various issues associated with the cables or wiring harnesses and connectors. Incorporation of wireless sensors 24, 26 into hydrostatic systems 22 may be particularly beneficial as usage of sensors in hydrostatic units increases, thereby otherwise necessitating more wiring harnesses and connectors, which are difficult to handle in vehicle production. Additionally, the wireless sensors 24, 26 eliminate any need for installing sensors after the hydrostatic system or unit is mounted to the engine, in an effort to protect the harnesses and/or connectors from damage, since the wireless sensors 24, 26 do not include such harnesses and connectors. Thus, the wireless sensors 24, 26 advantageously allow for all of the sensors 24, 26 to be installed on the hydrostatic unit or units of the hydrostatic system 22 during the assembly of the hydrostatic system 22 at a single manufacture or assembly plant.

While wireless sensors 24, 26 may cost more than conventional wired sensors, this additional cost may be offset by the additional cost of the wire harnesses and connectors associated with conventional wired sensors, as well as the additional assembly and 'running' repair and lifetime maintenance costs due to the wiring complexity, all of which is eliminated by the wireless sensors 24, 26. Additionally, removing the connectors and harnesses that would normally be required to connect sensors to the electronic control box, the hydrostatic system 22 of the present disclosure also advantageously frees up space within the vehicle around the electronic control box 28.

The wireless sensors 24, 26 of the present disclosure advantageously improve data management and provide adaptability by having the flexibility to transmit data to different locations in hydrostatic systems where there is an increasing demand for access to data related to the pumps and motors. For example, the sensor signals from the wireless sensors 24, 26 may be transmitted as wireless transmissions 30 to an inspection system having a different controller or telematics system during inspection of the hydrostatic system 22 or the hydrostatic unit 23 of the hydrostatic system 22 when the system or unit is disassembled from the vehicle, without the need to connect the wire harnesses to the inspection system.

While the principles of the present disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure. For example, although the wireless transmissions have been described in connection with RFID technology, it should be understood by those skilled in the art that other forms of wireless technology, such as Wi-Fi, Bluetooth, 4G, 5G or the like, could be used to generate the wireless transmissions while taking into consideration space, power consumption and/or similar requirements. Similarly, the present disclosure contemplates the transmitted signals may be multiplexed, for example, through signals that are interwoven in bandwidth or frequency.

What is claimed is:

1. A hydrostatic system comprising:
   a hydrostatic unit;
   at least one sensor configured to monitor a parameter of the hydrostatic unit, the at least one sensor including a wireless transmitter configured to generate wireless transmissions based on the parameter; and
   an electronic control box including a wireless receiver configured to receive the wireless transmissions generated by the at least one sensor and a processor configured to control the hydrostatic system based at least in part on the received wireless transmissions;
   wherein the electronic control box further comprises a wireless transmitter configured to generate reverse wireless transmissions; and
   wherein the at least one sensor further comprises a wireless receiver configured to receive the reverse wireless transmissions generated by the electronic control box.

2. The hydrostatic system according to claim 1, further comprising a housing containing the hydrostatic unit;
   wherein the at least one sensor is mounted to the housing.

3. The hydrostatic system according to claim 2, wherein the electronic control box is mounted to the housing.

4. The hydrostatic system according to claim 2, wherein the electronic control box is detached from the housing.

5. The hydrostatic system according to claim 1, wherein the at least one sensor includes a pressure sensor.

6. The hydrostatic system according to claim 1, wherein the at least one sensor includes a speed sensor.

7. The hydrostatic system according to claim 6, further comprising at least one second sensor;

wherein the at least one second sensor includes a pressure sensor.

8. The hydrostatic system according to claim 1, wherein the hydrostatic unit includes a pump.

9. The hydrostatic system according to claim 1, wherein the hydrostatic unit includes a motor.

10. The hydrostatic system according to claim 1, wherein the at least one sensor further comprises a battery.

11. The hydrostatic system according to claim 10, wherein the reverse wireless transmissions include power to charge the battery.

12. A hydrostatic system comprising:
    a housing;
    a hydraulic system including a pump disposed at least partially within the housing;
    at least one sensor mounted through the housing and configured to monitor a parameter of the hydraulic system, the at least one sensor including a wireless transmitter configured to generate wireless transmissions based on the parameter; and
    an electronic control box including a wireless receiver configured to receive the wireless transmissions generated by the at least one sensor and a processor configured to control the hydraulic system based at least in part on the received wireless transmissions;
    wherein the electronic control box further comprises a wireless transmitter configured to generate reverse wireless transmissions; and
    wherein the at least one sensor further comprises a wireless receiver configured to receive the reverse wireless transmissions generated by the electronic control box.

13. The hydrostatic system according to claim 12, wherein the electronic control box is mounted to the housing.

14. The hydrostatic system according to claim 12, wherein the electronic control box is detached from the housing.

15. The hydrostatic system according to claim 12, wherein the at least one sensor further comprises a battery; and
    wherein the reverse wireless transmissions include power to charge the battery.

16. A hydrostatic system comprising:
    a housing;
    a hydraulic system disposed at least partially within the housing;
    a plurality of sensors mounted through the housing, each sensor of the plurality of sensors configured to monitor a parameter of the hydraulic system, the plurality of sensors including at least one sensor comprising a wireless transmitter configured to generate wireless transmissions based on the monitored parameter; and
    an electronic control box including a wireless receiver configured to receive the wireless transmissions generated by the at least one sensor and a processor configured to control the hydraulic system based at least in part on the received wireless transmissions;
    wherein the electronic control box further comprises a wireless transmitter configured to generate reverse wireless transmissions; and
    wherein the at least one sensor further comprises a wireless receiver configured to receive the reverse wireless transmissions generated by the electronic control box.

17. The hydrostatic system according to claim 16, wherein the electronic control box is mounted to the housing.

* * * * *